(12) United States Patent
Liao et al.

(10) Patent No.: US 12,437,730 B2
(45) Date of Patent: Oct. 7, 2025

(54) CHOLESTERIC LIQUID CRYSTAL DISPLAY DEVICE WITH EFFICIENT CHARGING CAPABILITY AND ITS CHARGING METHOD

(71) Applicant: IRIS OPTRONICS CO., LTD., Tainan (TW)

(72) Inventors: Chi-Chang Liao, Tainan (TW); Junji Tomita, Atsugi (JP)

(73) Assignee: IRIS OPTOELECTRONICS CO., LTD., Tainan (TW)

( * ) Notice: Subject to any disclaimer, the term of this patent is extended or adjusted under 35 U.S.C. 154(b) by 0 days.

(21) Appl. No.: 18/653,938

(22) Filed: May 2, 2024

(65) Prior Publication Data

US 2024/0371337 A1 Nov. 7, 2024

Related U.S. Application Data

(60) Provisional application No. 63/463,558, filed on May 2, 2023.

(51) Int. Cl.
*G09G 3/36* (2006.01)

(52) U.S. Cl.
CPC ..... *G09G 3/3629* (2013.01); *G09G 2300/0842* (2013.01); *G09G 2320/0257* (2013.01); *G09G 2360/14* (2013.01)

(58) Field of Classification Search
CPC . H10K 59/00–95; G06F 1/165; G06F 1/1616; G06F 1/3203; G06F 1/263; G06F 1/26; G06F 1/3212; G06F 1/3234; Y02E 10/50; Y02E 70/30
See application file for complete search history.

(56) References Cited

U.S. PATENT DOCUMENTS 6,518,944 B1 * 2/2003 Doane ................ G02F 1/13318
345/87

FOREIGN PATENT DOCUMENTS

| CN | 111381631 A | * | 7/2020 | ........... G06F 1/1616 |
|---|---|---|---|---|
| JP | 2011-248130 A | | 12/2011 | |
| TW | I351809 B | | 11/2011 | |
| TW | I695879 B | | 6/2020 | |

OTHER PUBLICATIONS

CN-111381631-A (Year: 2020).*

* cited by examiner

*Primary Examiner* — Sanjiv D. Patel
(74) *Attorney, Agent, or Firm* — Cheng-Ju Chiang

(57) ABSTRACT

A cholesteric liquid crystal display device with efficient charging capability and its charging method are provided. The cholesteric liquid crystal display device comprises a cholesteric liquid crystal display unit, a power unit, and a control unit. The power unit comprising a solar cell module and an energy storage module electrically connected to the solar cell module. When the control unit detects the electrical energy stored in the energy storage module is less than a threshold, the control unit drives the cholesteric liquid crystal display unit to display in the FC state, then allowing the solar cell module to charge. When the control unit detects that the electrical energy stored in the energy storage module is greater than the threshold, the control unit drives the cholesteric liquid crystal display unit to display in the PL state, thereby reduces any afterimages issues that may occur during image transitions of the display device.

6 Claims, 4 Drawing Sheets

CHOLESTERIC LIQUID CRYSTAL DISPLAY DEVICE WITH EFFICIENT CHARGING CAPABILITY AND ITS CHARGING METHOD

BACKGROUND OF THE INVENTION

1. Field of the Invention

The present invention relates to a cholesteric liquid crystal display device with efficient charging capability and its charging method, particularly focusing on a cholesteric liquid crystal display device and its charging method capable of rapid charging and improving display performance.

2. Description of Related Art

In a cholesteric liquid crystal display device, the cholesteric liquid crystal has bistability characteristics of a planar (PL) state that reflects light and a focal conic (FC) state that transmits light. Even if the power is turned off, the image is retained semi-permanently. However, if the display image is held for a long time, even if the image is rewritten, an afterimage of that image is known to occur. The principle is disclosed by Fukuda et al. in Japanese Patent Laid-Open No. 2011-248130 (JP).

In the planar state, cholesteric molecules are aligned parallel to the substrate surface, forming a homogeneous and uniform texture. This alignment is achieved by the intermolecular interactions between the cholesteric molecules and the substrate surface, which lead to the parallel alignment of the long molecular axis with the substrate surface. In this state, the cholesteric molecules adopt a nearly planar conformation, with the long molecular axis perpendicular to the plane of the substrate.

In the tilted or focal conic state, cholesteric molecules are tilted at an angle with respect to the substrate surface, forming a conical texture. The degree of tilt depends on the strength of the applied electric field and the material properties of the substrate surface. The tilted state is characterized by a cone-like structure, with the long molecular axis tilted at an angle with respect to the plane of the substrate.

Also, from experience, it has been known that when the cholesteric liquid crystal display device is not in use, the problem of afterimages can be alleviated by storing it in a state where the entire surface is planar. For example, if the same image is displayed for one hour, an afterimage of the previous image occurs when the next image is displayed. However, if the display is left in the full planar state for 8 hours, there is no afterimage even if the same image is displayed for 8 hours. For this reason, the cholesteric liquid crystal display device must be stored in a state where the entire surface is planar state when no image is displayed. However, in a cholesteric liquid crystal display device with a solar cell mounted on the bottom, if left in the state of a full planar surface, the amount of light that can reach the solar cell is reduced, resulting in a problem of slow charging time.

Therefore, to reduce the problem of afterimages on cholesteric liquid crystal display device and to enable fast charging of cholesteric liquid crystal display devices, it is necessary to develop an ideal technological solution to address the aforementioned issues.

SUMMARY OF THE INVENTION

The purpose of the present invention is to provide a cholesteric liquid crystal display device with efficient charging capability and its charging method, enabling rapid charging of the cholesteric liquid crystal display device while also enhancing the display performance.

The present invention relates to a cholesteric liquid crystal display device with efficient charging capability. The cholesteric liquid crystal display device comprises a cholesteric liquid crystal display unit, a power unit, and a control unit.

The cholesteric liquid crystal display unit can alter the cholesteric liquid crystal therein to display in one of an optical state selected from a planar (PL) state and a focal conic (FC) state, wherein the FC state allows an incident light to pass through the cholesteric liquid crystal display unit, and the PL state blocks the incident light from entering the cholesteric liquid crystal display unit.

The power unit comprises a solar cell module and an energy storage module. The energy storage module electrically connects to the solar cell module, the solar cell module disposes on another plane of the cholesteric liquid crystal display unit where incident light enters. When the cholesteric liquid crystal displays unit in the FC state, the solar cell module configures to receive the incident light passing through the cholesteric liquid crystal display unit to generate and store electrical energy. That is to say, when light enters the cholesteric liquid crystal display unit, if it is in the PL state, the light will be blocked, but when it is in the FC state, light can pass through the cholesteric liquid crystal display unit and reach the solar cell module, allowing the solar cell module to generate and store electrical energy.

The control unit is coupled to the cholesteric liquid crystal display unit and the energy storage module. Wherein when the control unit detects that the electrical energy stored in the energy storage module is less than a threshold, the control unit drives the cholesteric liquid crystal display unit to display in the FC state. When the control unit detects that the electrical energy stored in the energy storage module is greater than the threshold, the control unit drives the cholesteric liquid crystal display unit to display in the PL state, hereby blocking the incident light from reaching the solar cell module.

Furthermore, the cholesteric liquid crystal display unit in the cholesteric liquid crystal display device comprises a stacked arrangement of blue cholesteric liquid crystal display module, green cholesteric liquid crystal display module, and red cholesteric liquid crystal display module from top to bottom, with the power unit positioned beneath the cholesteric liquid crystal display unit. From the user's perspective, the closest module to the user is the blue cholesteric liquid crystal display module.

Additionally, the control unit further comprises a driver module and a detection module. The detection module is coupled to the energy storage module, while the driver module is coupled to both the detection module and the cholesteric liquid crystal display unit. When the detection module detects that the electrical energy stored in the energy storage module is less than the threshold, the detection module controls the drive module to drive the cholesteric liquid crystal display unit to display in the FC state. When the detection module detects that the electrical energy stored in the energy storage module is greater than the threshold, the detection module controlling the drive module to drive the cholesteric liquid crystal display unit to display in the PL state.

Furthermore, the present invention is also a charging method for a cholesteric liquid crystal display device. The cholesteric liquid crystal display device comprises a cholesteric liquid crystal display unit, a power unit, and a control unit. And the cholesteric liquid crystal display unit has an optical state selected from one of a PL state and a FC state, wherein the FC state allows an incident light to pass through the cholesteric liquid crystal display unit, and the PL state blocks the incident light from entering the cholesteric liquid crystal display unit, the charging method includes the following steps:

Step: When the control unit detects that the electrical energy stored in the energy storage module is less than a threshold, the control unit drives the cholesteric liquid crystal display unit to display in the FC state; and Step: When the control unit detects that the electrical energy stored in the energy storage module is greater than the threshold, the control unit drives the cholesteric liquid crystal display unit to display in the PL state, hereby blocking the incident light from reaching the solar cell module.

Furthermore, the control unit further comprises a driver module and a detection module, and the charging method includes the following steps:

Step: When the detection module detects that the electrical energy stored in the energy storage module is less than the threshold, the detection module controls the drive module to drive the cholesteric liquid crystal display unit to display in the FC state; and Step: When the detection module detects that the electrical energy stored in the energy storage module is greater than the threshold, the detection module controls the drive module to drive the cholesteric liquid crystal display unit to display in the PL state.

Moreover, the cholesteric liquid crystal display unit further comprises a stacked arrangement of blue cholesteric liquid crystal display module, green cholesteric liquid crystal display module, and red cholesteric liquid crystal display module from top to bottom, with the power unit positioned beneath the cholesteric liquid crystal display unit. In other words, from the user's perspective, the power unit is furthest away within the entire cholesteric liquid crystal display unit.

Therefore, utilizing the cholesteric liquid crystal display device with efficient charging capability and its charging method provided by the present invention not only achieves rapid charging but also reduces afterimages issues and enhances the display performance of the cholesteric liquid crystal display device.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art.

The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
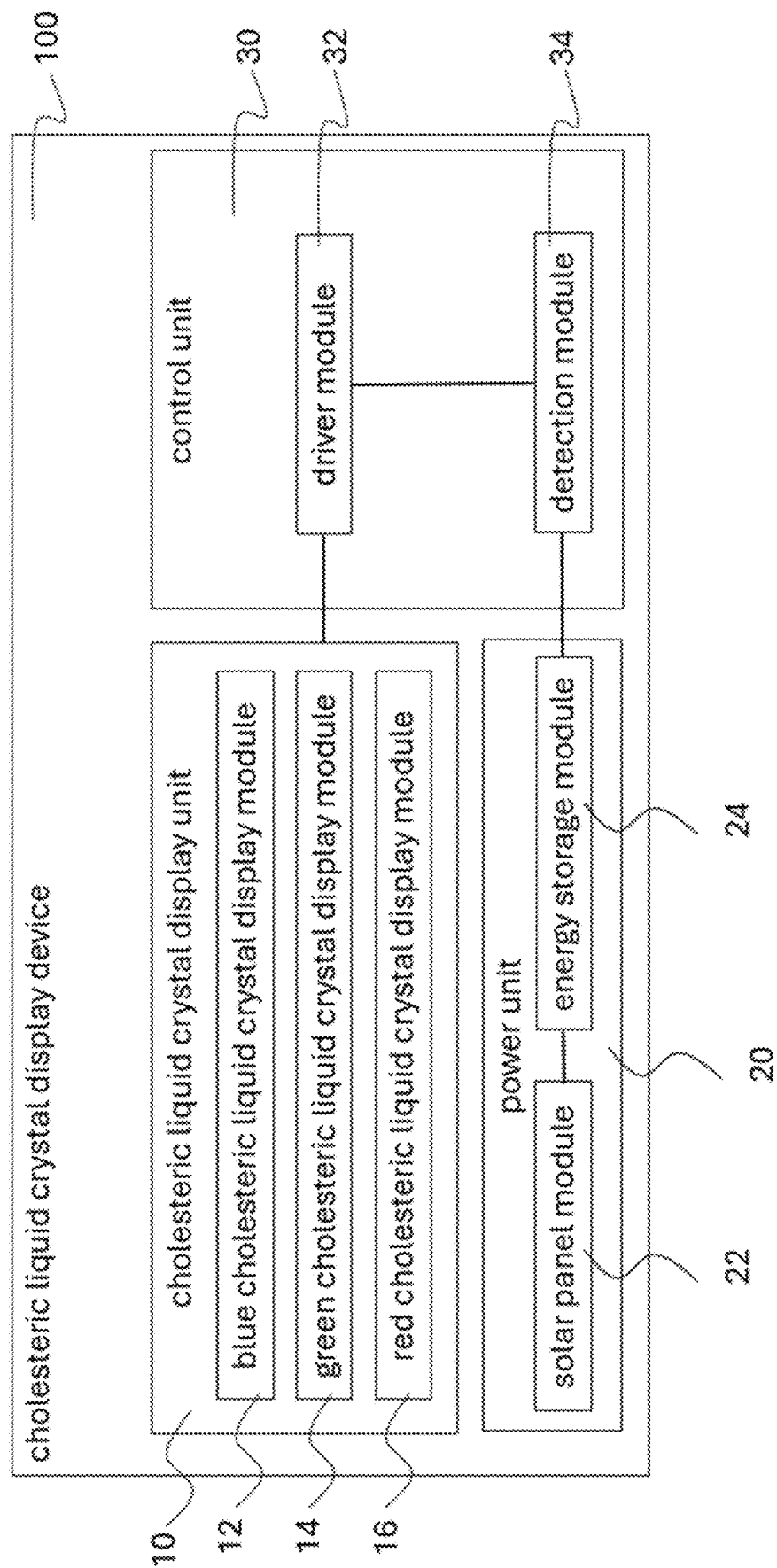
FIG. 1 is a schematic diagram of the associated cholesteric liquid crystal display device.

The present invention relates to a cholesteric liquid crystal display device with efficient charging capability. Please refer to FIG. 1, which illustrates the schematic diagram of the associated cholesteric liquid crystal display device of the present invention. The cholesteric liquid crystal display device 100 can switch between off state and display state, where the off state does not display images, while the display state is used to display images. The cholesteric liquid crystal display device 100 includes a cholesteric liquid crystal display unit 10, a power unit 20, and a control unit 30.

The cholesteric liquid crystal display unit 10 can alter the cholesteric liquid crystal therein, thereby producing either a PL state or FC state image. In the FC state, light can pass through, whereas in the PL state, light is blocked. In other words, by changing the cholesteric liquid crystal within the cholesteric liquid crystal display unit 10, the image can be in either PL state or FC state.

The power unit 20 further comprises a solar cell module 22 and an energy storage module 24. The energy storage module 24 electrically connects to the solar cell module 22. And the solar cell module 22 is capable of receiving light penetrating through the cholesteric liquid crystal display unit 10, generating and storing electrical energy. That is to say, when light enters the cholesteric liquid crystal display unit 10, if it is in the PL state, the light is blocked; however, if it is in the FC state, the light can pass through the cholesteric liquid crystal display unit 10 and reach the solar cell module 20, then allows the solar cell module 20 to generate and store electrical energy.

The control unit 30 is coupled to both the cholesteric liquid crystal display unit 10 and the energy storage module 24. When the control unit 30 detects that the electrical energy stored in the energy storage module 24 is less than a threshold, the control unit 30 drives the cholesteric liquid crystal display unit 10 to display in the FC state. When the control unit 30 detects that the electrical energy stored in the energy storage module 24 is greater than the threshold, the control unit 30 driving the cholesteric liquid crystal display unit 10 to display in the PL state, hereby blocking the incident light from reaching the solar cell module 22. That is to say, the control unit 30 can detect the charge level of the energy storage module 24. For example, when the cholesteric liquid crystal display device 100 transitions from the display state to off state, like in the case of low battery. The control unit 30 controls the cholesteric liquid crystal display unit 10 to display in FC state, allowing the solar cell module 20 to charge. Upon reaching the predetermined charge level of the energy storage module 24, the control unit 30 controls the cholesteric liquid crystal display unit 10 to display in PL state. At this time, the PL state image may or may not be the same as the FC state image.

Furthermore, the control unit 30 comprises a driver module 32 and a detection module 34. The detection module 34 is coupled to the energy storage module 24, while the driver module 32 is coupled to both the detection module 34 and the cholesteric liquid crystal display unit 10. When the detection module 34 detects that the electrical energy stored in the energy storage module 24 is less than the threshold, the detection module 34 controls the drive module 32 to drive the cholesteric liquid crystal display unit 10 to display in the FC state. And when the detection module 34 detects that the electrical energy stored in the energy storage module 24 is greater than the threshold, the detection module 34 controls the drive module 32 to drive the cholesteric liquid crystal display unit 10 to display in the PL state. In other words, when the detection module 34 detects the transition of the cholesteric liquid crystal display device 100 from the display state to off state, it instructs the driver module 32 to drive the cholesteric liquid crystal in the cholesteric liquid crystal display unit 10 to FC state. Upon detecting the energy storage module 24 reaching the predetermined charge level, the detection module 34 instructs the driver module 32 to drive the cholesteric liquid crystal in the cholesteric liquid crystal display unit 10 to PL state.

Figure 2:
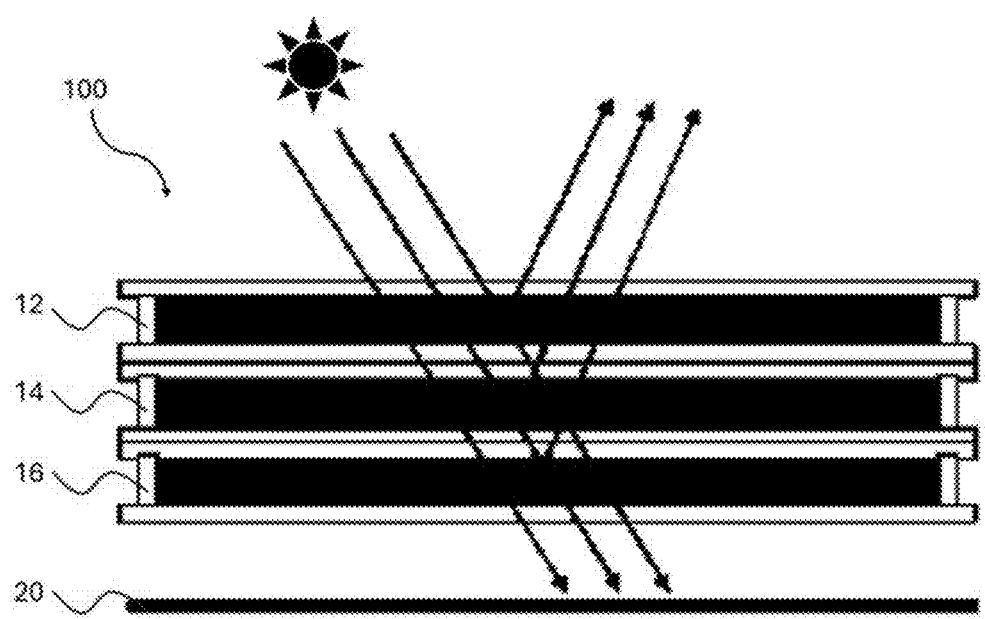
FIG. 2 is a structural schematic diagram of the cholesteric liquid crystal display unit.

Please refer to FIG. 2, which illustrates the structural schematic diagram of the cholesteric liquid crystal display unit 10 of the present invention. The cholesteric liquid crystal display unit 10 in the cholesteric liquid crystal display device 100 further comprises stacked blue cholesteric liquid crystal display module 12, green cholesteric liquid crystal display module 14, and red cholesteric liquid crystal display module 16 from top to bottom. The power unit 20 is positioned below the cholesteric liquid crystal display unit 10. From the user's perspective, the closest module to the user is the blue cholesteric liquid crystal display module 12, while the farthest is the power unit 20. When light penetrates through the blue cholesteric liquid crystal display module 12, green cholesteric liquid crystal display module 14, and red cholesteric liquid crystal display module 16 and reaches the power unit 20, the solar cell module 20 converts light energy into electrical energy and stores it.

Figure 3:
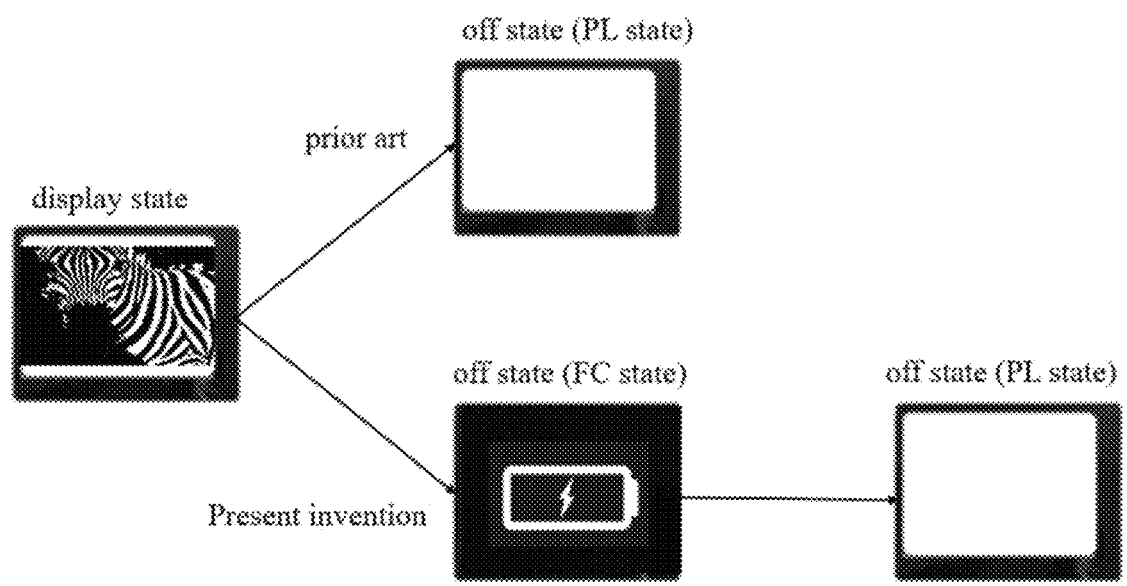
FIG. 3 is a comparison diagram between the present invention and prior art.

Please refer to FIG. 3, which is a comparison diagram between the present invention and prior art. As shown in the figure, in the prior art, when the cholesteric liquid crystal display device 100 was in the off state, it would directly enter the PL state. Although this could reduce the afterimages problem, the amount of electrical power generated and stored by the cholesteric liquid crystal display device 100 was relatively low. However, by adopting the present invention, the cholesteric liquid crystal display device 100 first enters the FC state, either completely or partially cholesteric liquid crystal, which allows for rapid charging until the cholesteric liquid crystal display device 100 is fully charged, and then switches to the PL state. That is to say, when the charging of the cholesteric liquid crystal display device is off state, only a portion of the cholesteric liquid crystal display unit needs to be in the FC state. Then can not only enables rapid charging but also reduces the problem of afterimages in the cholesteric liquid crystal display device 100.

Figure 4:
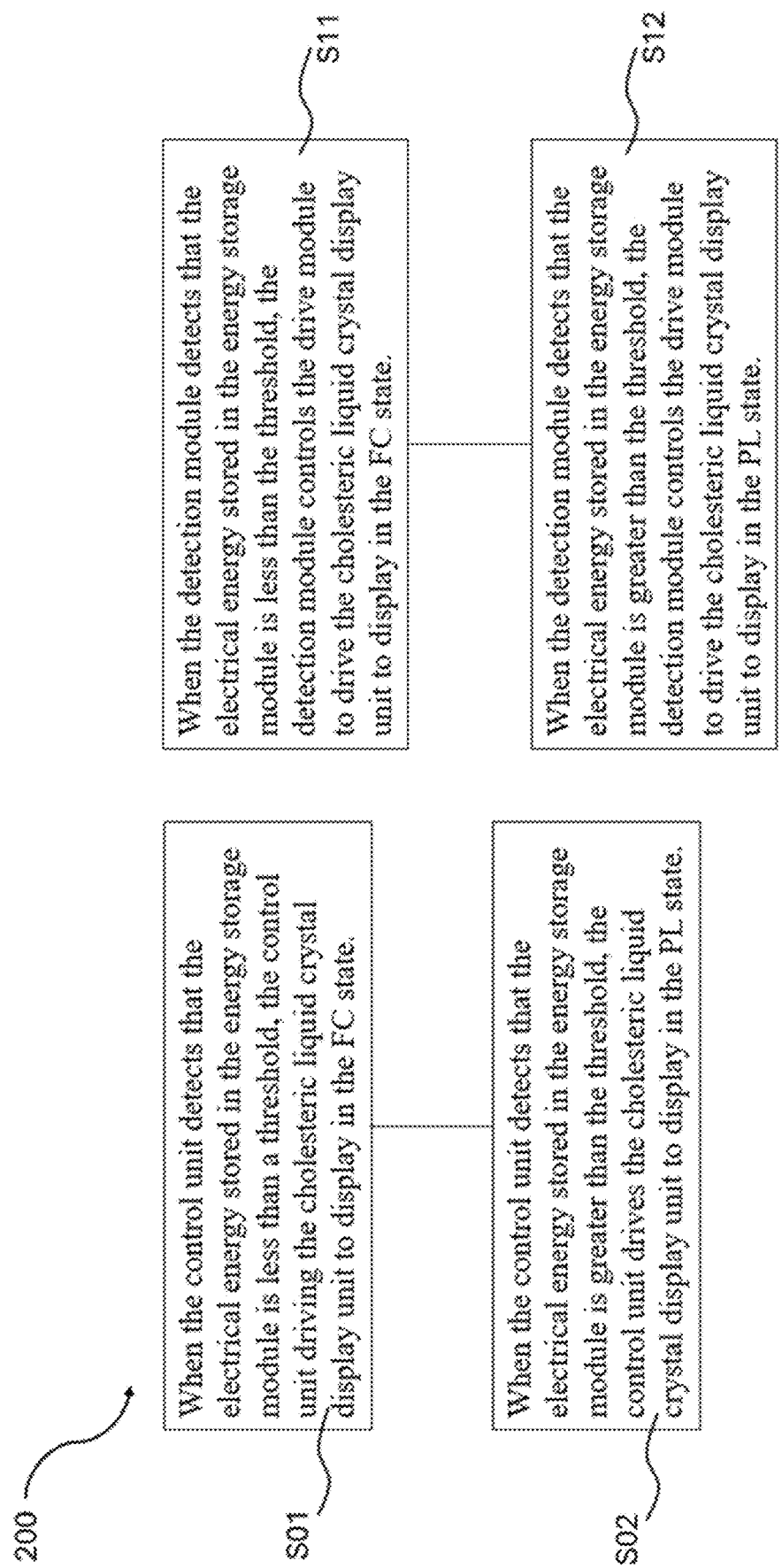
FIG. 4 is a flowchart of the charging method.

Please refer to FIG. 4, which is a flowchart of the charging method of the present invention. Furthermore, the present invention is also a charging method 200 for a cholesteric liquid crystal display device 100. The cholesteric liquid crystal display device 100 comprises a cholesteric liquid crystal display unit 10, a power unit 20, and a control unit 30. The cholesteric liquid crystal display unit 10 can switch between the off state and display state. And the cholesteric liquid crystal display unit 10 has a PL state or FC state image. Wherein in the FC state, light can pass through, and in the PL state, light is blocked. The charging method 200 includes the following steps:

Step S01: When the control unit 30 detects that the electrical energy stored in the energy storage module 24 is less than a threshold, the control unit 30 driving the cholesteric liquid crystal display unit 10 to display in the FC state. For example, when the cholesteric liquid crystal display device 100 transitions from the display state to off state, controls the cholesteric liquid crystal display unit 10 to display an image in the FC state.

Step S02: When the control unit 30 detects that the electrical energy stored in the energy storage module 24 is greater than the threshold, the control unit 30 drives the cholesteric liquid crystal display unit 10 to display in the PL state, hereby blocking the incident light from reaching the solar cell module 22. For example, when the energy storage module 24 reaches the predetermined charge level, controls the cholesteric liquid crystal display unit 10 to display an image in the PL state. At this time, the image in the FC state may or may not be the same as the image in the PL state.

In general, when the cholesteric liquid crystal display device 100 has insufficient power, it transitions from the display state to off state. At this time, the cholesteric liquid crystal display unit 10 can be controlled to display an image in the FC state, such as completely without an image, to facilitate the absorption of light, allowing the solar cell module 22 to generate and store electrical energy. When the energy storage module 24 reaches the predetermined charge level, the cholesteric liquid crystal display device 100 transitions from the FC state to the PL state. At this time, although there is still no image in the PL state, the energy storage module 24 is fully charged.

Alternatively, when the energy storage module 24 reaches the predetermined charge level, the cholesteric liquid crystal display device 100 transitions from the FC state to the PL state. In order to effectively distinguish the power status, the image in the PL state may have different images. That is when the battery is out of power, the FC state has not images. And when the battery is charged to a predetermined level, the PL stage has images. This allows users to quickly determine the power status of the cholesteric liquid crystal display device 100.

Furthermore, the control unit 30 further includes a detection module 34 and a driver module 32. The charging method 200 further includes the following steps:

Step S11: When the detection module 34 detects that the electrical energy stored in the energy storage module 24 is less than the threshold, the detection module 34 controls the drive module 32 to drive the cholesteric liquid crystal display unit 10 to display in the FC state. For example, when the detection module 34 detects that the cholesteric liquid crystal display device 100 transitions from the display state to off state, the driver module 32 drives the cholesteric liquid crystal in the cholesteric liquid crystal display unit 10 to the FC state, allowing the solar cell module 22 to charge.

Step S12: When the detection module 34 detects that the electrical energy stored in the energy storage module 24 is greater than the threshold, the detection module 34 controls the drive module 32 to drive the cholesteric liquid crystal display unit 10 to display in the PL state. For example, When the detection module 34 detects that the energy storage module 24 reaches the predetermined charge level, the driver module 32 drives the cholesteric liquid crystal in the cholesteric liquid crystal display unit 10 to the PL state.

Special circumstances can be at the entrance of a laboratory, there is a cholesteric liquid crystal display device 100 that presents a predetermined image. The displayed image shows "No Entry". When someone approaches, it switches to the display state, and when no one is nearby, it transitions to the off state. This means that when the cholesteric liquid crystal display device 100 detects no one nearby, it switches from the display state to the off state. At this point, the cholesteric liquid crystal display device 100 determines that the power level has not reached the threshold, so the cholesteric liquid crystal in the cholesteric liquid crystal display unit 10 becomes FC state to continue generating and storing power. When the energy storage module 24 reaches the predetermined charge level, the cholesteric liquid crystal in the cholesteric liquid crystal display unit 10 switches to the PL state. When the cholesteric liquid crystal display device 100 detects someone approaching, it switches back from the off state to the display state, displaying the image "No Entry".

Therefore, by using the cholesteric liquid crystal display device 100 and its charging method 200 provided by the present invention, not only can the cholesteric liquid crystal display device 100 be quickly charged, but also the problem of afterimages can be reduced. In other words, in addition to improving the charging capacity of the cholesteric liquid crystal display device 100, the present invention can also enhance the display effect of the cholesteric liquid crystal display device 100.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display device with efficient charging capability, the cholesteric liquid crystal display device comprising:
   a cholesteric liquid crystal display unit capable of changing the cholesteric liquid crystal therein to display in one of an optical state selected from a planar (PL) state and a focal conic (FC) state, wherein the FC state allowing an incident light to pass through the cholesteric liquid crystal display unit, and the PL state blocking the incident light from entering the cholesteric liquid crystal display unit;
   a power unit comprising a solar cell module and an energy storage module electrically connected to the solar cell module, the solar cell module disposed on another plane of the cholesteric liquid crystal display unit where incident light enters, and the solar cell module configuring to receive the incident light passing through the cholesteric liquid crystal display unit to generate and store electrical energy when the cholesteric liquid crystal display unit in the FC state; and
   a control unit coupling to the cholesteric liquid crystal display unit and the energy storage module, wherein when the control unit detecting that the electrical energy stored in the energy storage module is less than a threshold, the control unit driving the cholesteric liquid crystal display unit to display in the FC state, when the control unit detecting that the electrical energy stored in the energy storage module is greater than the threshold, the control unit driving the cholesteric liquid crystal display unit to display in the PL state, hereby blocking the incident light from reaching the solar cell module.

2. The cholesteric liquid crystal display device according to claim 1, wherein the cholesteric liquid crystal display unit further comprising a blue cholesteric liquid crystal display module, a green cholesteric liquid crystal display module, and a red cholesteric liquid crystal display module stacked from top to bottom, and the power unit positioning below the cholesteric liquid crystal display unit.

3. The cholesteric liquid crystal display device according to claim 1, wherein the control unit further comprising a driver module and a detection module, the detection module being coupled to the energy storage module, the driver module being coupled to the detection module and the cholesteric liquid crystal display unit, when the detection module detecting that the electrical energy stored in the energy storage module is less than the threshold, the detection module controlling the drive module to drive the cholesteric liquid crystal display unit to display in the FC state.

4. The cholesteric liquid crystal display device according to claim 3, wherein when the detection module detects that the electrical energy stored in the energy storage module is greater than the threshold, the detection module controlling the drive module to drive the cholesteric liquid crystal display unit to display in the PL state.

5. A charging method for a cholesteric liquid crystal display device, the cholesteric liquid crystal display device comprising a cholesteric liquid crystal display unit, a power unit and a control unit, wherein the control unit further comprising a driver module and a detection module, and the cholesteric liquid crystal display unit having an optical state selected from one of a planar (PL) state and a focal conic (FC) state, wherein the FC state allowing an incident light to pass through the cholesteric liquid crystal display unit, and the PL state blocking the incident light from entering the cholesteric liquid crystal display unit, the charging method comprising the following steps:

when the control unit detecting that the electrical energy stored in the energy storage module is less than a threshold, the control unit driving the cholesteric liquid crystal display unit to display in the FC state;

when the control unit detecting that the electrical energy stored in the energy storage module is greater than the threshold, the control unit drives the cholesteric liquid crystal display unit to display in the PL state, hereby blocking the incident light from reaching the solar cell module;

when the detection module detecting that the electrical energy stored in the energy storage module is less than the threshold, the detection module controlling the drive module to drive the cholesteric liquid crystal display unit to display in the FC state; and when the detection module detecting that the electrical energy stored in the energy storage module is greater than the threshold, the detection module controlling the drive module to drive the cholesteric liquid crystal display unit to display in the PL state.

6. The charging method according to claim 5, wherein the cholesteric liquid crystal display unit further comprising a blue cholesteric liquid crystal display module, a green cholesteric liquid crystal display module, and a red cholesteric liquid crystal display module stacking from top to bottom, and wherein the power unit being positioned below the cholesteric liquid crystal display unit.

\* \* \* \* \*